Patented Feb. 4, 1947

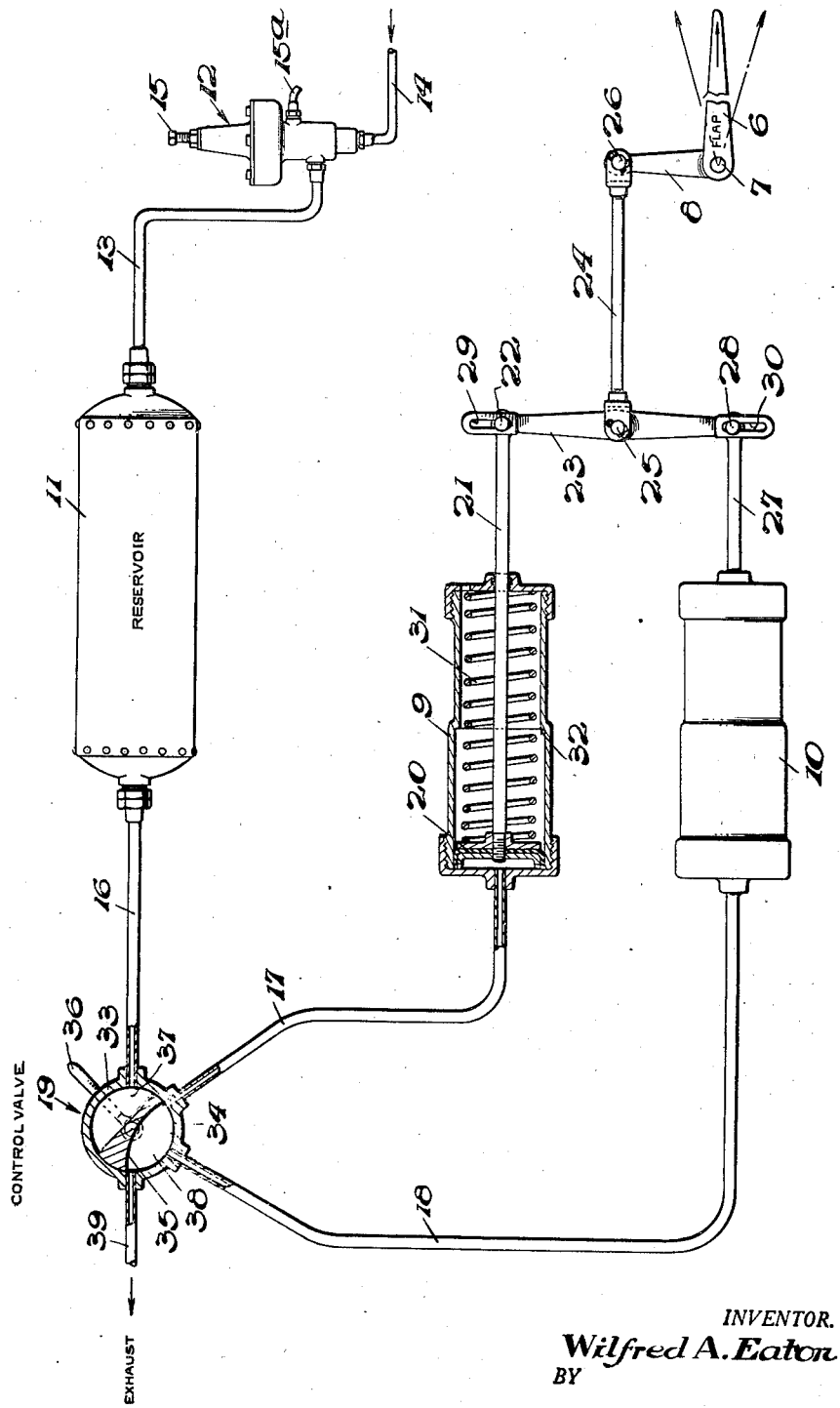

2,415,128

UNITED STATES PATENT OFFICE 2,415,128

FLUID PRESSURE CONTROL MECHANISM

Wilfred A. Eaton, Elyria, Ohio, assignor to Bendix-Westinghouse Automotive Air Brake Company, Elyria, Ohio, a corporation of Delaware Application July 30, 1943, Serial No. 496,801

8 Claims. (Cl. 244—85)

This invention relates to fluid pressure control mechanism, and more particularly to fluid pressure means for operating the control surfaces of an airplane or other body adapted for operation in a fluid medium.

Present day airplanes are often equipped with auxiliary control surfaces known as flaps which are normally maintained in line with the main wing and are deflected downward prior to landing in order to increase the lift of the wing and decrease the landing speed, and it has been customary in some cases to provide means for moving these flaps to different positions depending on the particular landing conditions obtaining at the time. Many of these systems have entailed the use of complicated mechanism, however, and it is accordingly an object of the present invention to provide simple and efficient means for controlling the landing flaps of an airplane.

Another object of the invention is to provide means, under the control of the pilot, for applying a resilient force to the landing flaps in order to move them to a plurality of operating positions which are substantially fixed.

Yet another object of the invention is to provide means for applying a resilient force for the operation of the landing flaps, so constituted as to permit automatic retraction of the flaps against the resilient force under overload conditions.

Still another object of the invention is to provide means for automatically limiting the force which may be applied to the landing flaps, in order to limit the stress which can be imparted to the airplane by the operation of the flaps.

These and other objects and novel features of the invention will appear more fully hereinafter from the following description when taken in connection with the accompanying drawing. It is to be expressly understood, however, that the drawing is employed for purposes of illustration only, and is not designed as a definition of the limits of the invention, reference being had for this purpose to the appended claims.

In the drawing, the single view of which shows a diagrammatic illustration of the present system as applied to an airplane, not shown, a landing flap 6 pivotally mounted on the body of the airplane by means of a shaft 7, is provided with an operating lever 8. This lever is adapted for actuation by means of a pair of identical fluid motors 9 and 10, mounted on the body portion of the airplane, the construction of the fluid motors being shown in section in connection with the motor 9. The means for supplying fluid pressure includes a reservoir 11 adapted to be supplied with fluid at a predetermined pressure by means of a feed valve 12, of well-known construction, connected thereto by means of a conduit 13, and supplied with fluid pressure from a suitable compressor or other source of fluid pressure, not shown, through the medium of a conduit 14. The feed valve is provided with an adjusting screw 15, and it will be understood that the above screw may be so adjusted as to cause the feed valve to supply fluid pressure to the reservoir 11 at a predetermined pressure and to maintain this pressure, regardless of the pressure in the supply conduit 14. The feed valve is also provided with an exhaust outlet 15a, and it will be understood that when the pressure in conduit 13 exceeds the pressure for which the feed valve is set, the latter will be effective to connect conduit 13 with atmosphere until the excess pressure is relieved. Fluid pressure is conveyed from the reservoir to the fluid motor 9 through conduits 16 and 17, and to the motor 10 through conduits 16 and 18, the connection between conduit 16 and the conduits 17 and 18 being controlled by means of a control valve 19, to be more fully described hereinafter.

The fluid motor 9 is provided with a piston 20 having a piston rod 21 connected thereto, the piston rod being connected with the lever 8 on the landing flap by virtue of its pivotal connection 22 with the upper end of a beam 23, the beam being connected at another point with the upper end of the lever 8 by means of a connecting rod 24 connected to the beam by means of a pin 25 and to the lever by means of a pin 26. The motor 10 is provided with a similar piston having a piston rod 27, and the piston rod 27 is connected to the lower end of the beam by means of a pivot pin 28, it being noted that the pivot pins 22 and 28 engage slots 29 and 30 in the ends of the beam in order to permit compensation for angular movement of the beam with respect to the piston rods. The piston rods, and consequently the beam and the flap, are normally maintained in the position shown by means of preloaded return springs, similar to spring 31 shown in the motor 9, this spring serving to normally maintain the piston 20 against the left end of the motor casing, and it will thus be apparent that any tendency toward counter-clockwise rotation of the flap from the position shown is prevented by the abutment of the pistons against the left ends of the motor casings. It will also be noted that the motor 9 is provided with a shoulder 32 which serves to limit movement of the piston to the right on the application of fluid pressure thereto and it will be understood that a similar shoulder is provided in connection with the motor 10 for similarly limiting the movement of the piston rod 27.

In order to control the application of fluid pressure to the motors, the control valve 19 is provided with a casing 33, a bore 34 formed therein being provided with a rotating valve member 35 provided with an operating handle 36 and shaped as shown. With the valve member 35 in the position shown, a chamber 37 is formed between the valve member and the casing which is connected with the conduit 16, the other side of the valve member forming, in connection with the casing, a chamber 38 which is connected with atmosphere through the medium of a conduit 39 and with conduits 17 and 18 leading to motors 9 and 10. Thus with the valve in the position shown, the conduit 16 is isolated from the fluid motor, and the fluid motors are connected with atmosphere through the conduits 17 and 18, the chamber 38 and the conduit 39.

If it is desired to move the flap through a relatively small angle during landing of the airplane, the valve handle 36 and the valve member 35 may be moved through an angle sufficient to establish a connection through the chamber 37 between conduits 16 and 17, whereupon fluid pressure is admitted to the left end of the motor 9 in order to move the piston to the right until it abuts the shoulder 32, the pressure supplied by the feed valve 12 being so chosen as to provide sufficient pressure to overcome the tension of the spring 31 and to maintain the flap in the new position against any normal force exerted thereon by the slip stream of the airplane. If, however, due to excessive speed of the airplane, the slip stream forces exerted on the flap are materially increased, it will also be understood that the pressure in the reservoir 11 may be so chosen, in the event a compressible medium is utilized, as to permit the force acting on the flap to move the latter in the reverse direction to compress the fluid in the left end of the fluid motor 9 in order to permit sufficient retraction of the flap to compensate for the overload condition, the compressed fluid being exhausted through the atmospheric connection 15a of the feed valve.

In the event greater angularity of the flap is required under certain conditions, it is only necessary for the operator to further move the lever 36 in the same direction in order to prevent communication between conduit 18 and conduit 39 through chamber 38, and to permit communication between conduit 16 and both conduits 17 and 18 through chamber 37, whereupon the piston rod 27 of the motor 10 will also be moved to the right in order to move the beam 23 in a counter-clockwise direction about the pivot pin 22, with consequent further movement of the rod 24 to the right to correspondingly move the flap to a new position. Here again the piston of the motor 10 will abut the shoulder provided therein, as above referred to, and the new position of the flap will be definitely fixed, except during overload conditions such that forces exerted by the slip stream are sufficient to move the flap in reverse direction against the pressure of fluid in the left ends of the fluid motors. In order to return the flap to the neutral position shown in the drawing, the control handle 36 is again returned to the position shown, being moved in a counter-clockwise direction for this purpose, whereupon the conduit 16 will again be disconnected from the conduits 17 and 18 and the latter conduits will be connected to atmosphere through the atmospheric conduit 39. If partial retraction of the flap is desired, the operating handle may be moved in a counter-clockwise direction sufficiently to maintain the connection between the conduits 16 and 17 and to establish a connection between conduits 18 and 39, whereupon the piston rod 27 will return to the position shown, while the piston rod 21 will be fully extended through the action of fluid pressure in the motor 9.

There has thus been provided by the above described mechanism means for definitely maintaining the flap in three different positions, the flap being maintained in the neutral position shown by means of the preloaded spring which may be preloaded to maintain the flap in this position with any predetermined degree of force, the degree of force exerted to prevent movement of the flap from the other positions by the action of the slip stream being determined by the pressure for which the feed valve 12 is adjusted, when considered in connection with the forces exerted by the springs with the flap in these positions. In view of the fact that in the embodiment illustrated the stops for the pistons are incorporated in the motor casings, it will be apparent that no unnecessary stresses are placed on the structure of the airplane when the pistons are moved against the stops by application of fluid pressure thereto, thus eliminating stresses which would otherwise be present in the event the stops were placed on the fuselage in order to operate to limit movement of the beam 23. The feed valve 12 may be adjusted to correspond with the operating conditions obtaining with any particular design of airplane, and it will be seen that the mechanism will operate without further adjustments of any kind. The three positions of the flap may be readily controlled by the pilot through manipulation of the single control handle 36, resulting in a simple and efficient control requiring a minimum of effort on the part of the pilot, while overloading is prevented by operation of the feed valve.

While the invention has been illustrated and described herein with considerable particularity, it is to be understood that the same is not limited to the forms shown but may receive a variety of mechanical expressions as are readily apparent to those skilled in the art. Reference will, therefore, be had to the appended claims for a definition of the limits of the invention.

What is claimed is:

1. The combination with a body adapted for movement in a fluid medium having a control element movably mounted with respect thereto having a neutral position and movable to a low or high angle position to divert the flow of fluid medium by said body for controlling the operation thereof, of means for controlling the operation of said element including a fluid actuator for moving the latter to the low angle position, means including said actuator and a second fluid actuator for moving said element to the high angle position, means including a single control valve for selectively controlling the supply of a compressible fluid pressure medium to said actuators and the release of fluid pressure therefrom, means for yieldingly opposing the operation of said element by said actuators and normally urging the element to neutral position on release of fluid pressure from said actuators, and means operable when the force exerted on said element by said fluid medium exceeds a predetermined value for permitting movement of said element toward neutral position including means for limiting the pressure of compressible fluid supplied to said actuators to a predetermined value.

2. The combination with a body adapted for movement in a fluid medium having a control element movably mounted with respect thereto having a neutral position and movable to a low or high angle position to divert the flow of fluid medium by the body for controlling the operation thereof, of means for selectively controlling the movement of said element to the low or high angle position and for permitting movement thereof toward neutral position when the force exerted thereon by said fluid medium exceeds a predetermined value including a fluid actuator for moving said element to said low angle position, means including said actuator and a second fluid actuator for moving said element to said high angle position, means for yieldingly opposing the action of said actuators and normally urging the element toward neutral position, means including a single control valve for selectively supplying a compressible fluid pressure medium to each of said actuators, and means for exhausting fluid pressure from said actuators at a predetermined substantially constant pressure when fluid is compressed by said actuators on movement of said element toward neutral position under the action of the force exerted thereon by said fluid medium.

3. The combination with a body adapted for movement in a fluid medium having a control element movably mounted with respect thereto having a neutral position and movable to a low angle or high angle position to divert the flow of fluid medium thereby for controlling the operation thereof, of means for selectively controlling the movement of said element to the low or high angle position and to neutral position including a lever for operating the element, a fluid actuator having a piston rod having a connection with the lever, a second fluid actuator having a piston rod having a connection with the lever spaced from the first named connection, means for limiting the stroke of each piston rod, a spring associated with each actuator for moving the corresponding piston rod in one direction, means including a single control valve for selectively supplying a compressible fluid pressure medium to the first named actuator or to both actuators for moving the corresponding piston rods in the opposite direction to move the element to a low or high angle position, and means for connecting the element with the lever at a point intermediate the two first named connections.

4. The combination with a body adapted for movement in a fluid medium having a control element movably mounted with respect thereto having a neutral position and movable to a low angle or high angle position to divert the flow of fluid thereby for controlling the operation thereof, of means for controlling the operation of said element and moving the latter to one or the other of said low or high angle positions including an actuator for moving the element to the low angle position, means including said actuator and a second actuator for moving the element to the high angle position, resilient means for opposing movement of said element to said low and high angle positions and for urging the latter toward neutral position, a source of compressible fluid medium for said actuators, a single control means for selectively controlling the supply of fluid from said source for energizing the first named actuator or both actuators, and means for limiting the power supplied to said actuators to a predetermined value.

5. The combination with a body adapted for movement in a fluid medium having a control element movably mounted with respect thereto having a neutral position and movable to a low angle or high angle position to divert the flow of fluid medium thereby for controlling the operation thereof, of means for controlling the operation of said element and moving the latter to one or the other of said low or high angle positions including an actuator for moving said element to the low angle position, means including said actuator and a second actuator for moving said element to the high angle position, resilient means for opposing movement of said element to said low and high angle positions and for urging the latter toward neutral position, a source of compressible fluid medium for said actuators, control means for selectively controlling the supply of fluid from said source to said actuators, means for limiting the power supplied to said actuators whereby the force exerted on the element by the actuators is limited to a predetermined value, and means associated with said last named means for permitting movement of said element toward neutral position when the force exerted by the fluid medium on said element is sufficient to overcome said predetermined force.

6. The combination in an airplane having a body portion and an airfoil movably mounted with respect thereto having a neutral position and movable to a low angle or a high angle position, of means for maintaining said airfoil in neutral position and for moving the same to either said low angle or high angle position including a fluid actuator for moving said airfoil to said low angle position, means including said fluid actuator and a second fluid actuator for moving the airfoil to the high angle position, means associated with said actuators for limiting the movements of said airfoil, means for operatively connecting the actuators with the airfoil, means including a single control valve for selectively supplying a compressible fluid pressure medium to the first actuator or to both actuators whereby the airfoil is moved to said low angle or high angle position, and means within the actuators to resiliently oppose movement of the airfoil by the actuators and to return the airfoil to neutral upon release of fluid pressure from the actuators.

7. The combination in an airplane having a body portion and an airfoil movably mounted with respect thereto having a neutral position and movable to a low angle or a high angle position, of means for moving said airfoil to said low angle or high angle position comprising a lever having a connection with the airfoil, a pair of fluid actuators having connections with the lever at points spaced apart on opposite sides of the first connection, means for limiting the strokes of each actuator in opposite directions, means associated with each actuator to yieldingly oppose operation thereof and normally urging the airfoil to neutral position, and means including a single control valve for selectively supplying a compressible fluid pressure medium to one or both of said actuators to move the airfoil to said low angle or high angle position.

8. A control system for a pivoted airplane flap comprising a lever having a connection between its ends with the flap, a fluid actuator having an actuated member connected with one end of the lever, a second fluid actuator having an actuated member connected with the other end of the lever, a spring within each actuator normally urging the actuated members to one end of the actuators to maintain the flap in neutral position, stop means within each actuator to limit movement of the actuated members in the opposite direction, means including a single control valve for energizing the first actuator with a compressible fluid pressure medium to move its actuated member against the stop means and actuate the flap to a low angle position, and for thereafter energizing both said actuators to move the actuated member of the second actuator against the stop means and actuate the flap to a high angle position, and means operable when the force exerted by the air pressure on said flap during flight of the airplane exceeds a predetermined value for allowing movement of the flap toward neutral position.

WILFRED A. EATON.

REFERENCES CITED

The following references are of record in the file of this patent:

UNITED STATES PATENTS

| Number | Name | Date |
|---|---|---|
| 285,883 | Fisher | Oct. 2, 1883 |
| 2,316,235 | Gast | Apr. 13, 1943 |
| 2,226,821 | Kempson | Dec. 31, 1940 |
| 1,969,462 | Hodgkins | Aug. 7, 1934 |
| 585,649 | Brinkman | July 6, 1897 |
| 616,886 | Brinkman | Jan. 3, 1899 |
| 1,795,896 | Schench | Mar. 10, 1931 |
| 2,279,615 | Bugatti | Apr. 14, 1942 |
| 1,856,219 | Lange | May 3, 1932 |

FOREIGN PATENTS

| Number | Country | Date |
|---|---|---|
| 818,875 | French | Oct. 5, 1937 |